(12) United States Patent
Bonardi (10) Patent No.: US 12,410,018 B2
(45) Date of Patent: Sep. 9, 2025

(54) CAROUSEL MACHINE FOR PROCESSING CONTAINERS

(71) Applicant: P.E. LABELLERS S.P.A., Porto Mantovano (IT)

(72) Inventor: Luca Bonardi, San Giorgio Bigarello (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 42 days.

(21) Appl. No.: 18/287,073

(22) PCT Filed: Apr. 6, 2022

(86) PCT No.: PCT/EP2022/059147
§ 371 (c)(1),
(2) Date: Oct. 16, 2023

(87) PCT Pub. No.: WO2022/223300
PCT Pub. Date: Oct. 27, 2022

(65) Prior Publication Data
US 2024/0199347 A1 Jun. 20, 2024

(30) Foreign Application Priority Data
Apr. 20, 2021 (IT) .......................... 102021000009941

(51) Int. Cl.
*B65G 47/84* (2006.01)
*B65C 9/02* (2006.01)
(Continued)

(52) U.S. Cl.
CPC .............. *B65G 47/846* (2013.01); *B65C 9/02* (2013.01); *B65G 17/323* (2013.01); *B65G 54/02* (2013.01); *B65G 2201/0244* (2013.01)

(58) Field of Classification Search
CPC ........ B65C 9/02; B65G 54/02; B65G 47/846; B65G 17/323
(Continued)

(56) References Cited

U.S. PATENT DOCUMENTS 11,584,628 B2 * 2/2023 Orndorff ................ B65G 54/02
2005/0256774 A1 * 11/2005 Clothier ................. G06Q 10/06
705/15

FOREIGN PATENT DOCUMENTS

EP 3718913 A1 * 10/2020 ............... B65C 3/08
JP 2014024665 A * 2/2014 ........... B65G 47/846
(Continued)

OTHER PUBLICATIONS

International Search Report and Written Opinion issued Jun. 13, 2022 which pertains to PCT Application No. PCT/EP2022/059147, filed Apr. 6, 2022. 8 pages.

*Primary Examiner* — James R Bidwell
(74) *Attorney, Agent, or Firm* — THOMPSON HINE LLP (57) ABSTRACT

A carousel machine for processing containers includes a rotating carousel, provided peripherally with pans for supporting the individual containers to be processed, and a device for loading/unloading the containers from the carousel. The loading/unloading device includes at least one linear motor which has a stationary track with a closed path and handling carriages, which are mounted so that they can move slidingly and in mutual succession along the track and each support at least one respective jaw adapted to cooperate with a jaw supported by a contiguous carriage in order to engage, on mutually opposite sides, a container to be transferred or picked up from the carousel. Control of the linear motor is provided and is adapted to actuate variation of the mutual distance of mutually contiguous carriages in order to allow the release or clamping of a container by the corresponding jaws.

10 Claims, 11 Drawing Sheets

(51) Int. Cl.
*B65G 17/32* (2006.01)
*B65G 54/02* (2006.01)
(58) Field of Classification Search
USPC .......................................................... 198/805
See application file for complete search history.

(56) References Cited

FOREIGN PATENT DOCUMENTS

| JP | 2021172523 A | * | 11/2021 | ............ | B65G 29/00 |
|----|--------------|---|---------|--------------|------------|
| WO | 2015/036159 A1 | | 3/2015 | | |
| WO | 2019/159116 A1 | | 8/2019 | | |

* cited by examiner

CAROUSEL MACHINE FOR PROCESSING CONTAINERS

The present invention relates to a carousel machine for processing containers.

As is known, carousel machines for processing containers and in particular carousel-type labeling machines generally have a conveyor for conveying the containers to be processed along an advancement path which comprises at least one rotating carousel, which is normally provided, at its peripheral region, with rotating supporting pans for the individual containers, which are adapted to rotate the containers about their corresponding axes, and around which one or more labeling assemblies are arranged which are mutually angularly spaced around the axis of the carousel and are designed to apply a respective label to the containers passing on the carousel.

The containers to be processed, which arrive from a feeding conveyor, are loaded on the carousel at an input station, wherein an input star conveyor operates which transfers the individual containers arriving from the feeding conveyor onto a respective supporting pan of the carousel.

Spacer means are associated with the feeding conveyor and are typically constituted by a screw feeder, which allows to arrange the containers traveling on the feeding conveyor at a predetermined distance from each other so that they can be picked up correctly by the input star conveyor.

The processed containers are then unloaded from the carousel at an output station, in which there is an output star conveyor designed to pick up the processed containers from their respective supporting pans and deliver them to an unloading conveyor.

The input and output star conveyors are typically provided by rotating disks, provided perimetrically with container accommodation receptacles which are shaped and sized according to the shape and sizes of the containers that the machine is required to process.

Consequently, machines thus structured have the drawback of requiring, at each change of format of the containers to be processed, the disassembly of the existing input and output star conveyors and their replacement with others suitable for the new format of the containers to be processed, with consequent relatively long machine downtimes.

The aim of the present invention is to provide a carousel machine for processing containers that is capable of improving the background art in one or more of the aspects indicated above.

Within this aim, an object of the invention is to provide a carousel machine for processing containers that allows to perform the operations linked to the change of format of the containers in extremely quick times with respect to the background art.

Another object of the invention is to provide a carousel machine for processing containers that can be extremely versatile so as to be capable of processing containers of multiple different formats in the same work cycle.

Another object of the present invention is to provide a carousel machine for processing containers that can offer the greatest assurances of reliability and safety in operation.

Yet another object of the present invention is to provide a carousel machine for processing containers that is relatively simple to provide.

A still further object of the present invention is to overcome the drawbacks of the background art in a manner that is alternative to any existing solutions.

Not least object of the invention is to provide a carousel machine for processing containers that can be manufactured with low costs so as to be competitive also from a purely economic standpoint.

Further characteristics and advantages of the invention will become better apparent from the description of a preferred but not exclusive embodiment, of the carousel machine for processing containers according to the invention, illustrated by way of non-limiting example in the accompanying drawings, wherein.

With reference to the figures, the carousel machine for processing containers according to the invention, generally designated by the reference numeral 1, comprises a rotating carousel 2, which is provided peripherally with pans 3 for supporting the individual containers 4 to be processed.

Conveniently, the pans 3 are rotatably actuated so as to rotate, about the corresponding axes, the containers 4 that rest thereon.

One or more assemblies for processing the containers 4 are designed to be positioned around the carousel 2.

For example, if the machine is called to perform the labeling of the containers 4, one or more labeling assemblies, not shown, are arranged around the carousel 2 and allow to apply to the containers 4 that pass on the carousel 2 a respective label, as per se known.

Furthermore, the machine is provided with loading/unloading means 5 which have the function of loading the individual containers 4 onto the carousel 2, so that they can receive the desired processing, and of unloading them from said carousel, once the desired processing has been received.

The loading/unloading means 5 comprise at least one linear motor 6, which comprises a stationary track 7 with a closed extension, which constitutes the fixed part of the linear motor, and handling carriages 8a, 8b, 9a, 9b, 10a, 10b for conveying the containers 4, which are mounted so that they can move slidingly and in mutual succession along the track 7 and constitute in turn the translating part of the linear motor 6.

Again according to the invention, the carriages 8a, 8b, 9a, 9b, 10a, 10b each support at least one respective jaw 11a, 11b adapted to cooperate with a jaw 11a, 11b supported by a contiguous carriage in order to engage, on mutually opposite sides, a container 4 to be transferred or picked up from the carousel 2.

Means 100 for the control of the linear motor 6 are also provided which are adapted to actuate the variation of the mutual distance of the carriages 8a, 8b, 9a, 9b, 10a, 10b which are mutually contiguous, so as to allow the release or clamping of a container 4 by corresponding jaws 11a, 11b.

Preferably, at least one pair of mutually contiguous handling carriages can move slidingly along the track 7, such carriages supporting respective jaws 11a, 11b adapted to mutually cooperate in order to engage, on mutually opposite sides, a container 4 to be transferred or picked up from the carousel 2.

More preferably, there is a plurality of pairs 8, 9, 10 of carriages 8a, 8b, 9a, 9b, 10a, 10b arranged in mutual succession along the track 7, and the carriages 8a, 8b, 9a, 9b, 10a, 10b of each pair 8, 9, 10 each support a respective jaw 11a, 11b structured so that the jaws 11a, 11b supported by the carriages 8a, 8b, 9a, 9b, 10a, 10b of each pair 8, 9, 10 of carriages are capable of mutually cooperating in order to engage, on mutually opposite sides, a respective container 4.

Advantageously, the carriages 8a, 8b, 9a, 9b, 10a, 10b are actuated in motion along the track 7 in order to move along the track 7 according to a handling direction, and the control means 100 conveniently provide, in this case, the variation of the distance between the contiguous carriages 8a, 8b, 9a, 9b, 10a, 10b, i.e., between the carriages 8a, 8b, 9a, 9b, 10a, 10b of each pair 8, 9, 10 by means of a variation of the speed of one of the carriages 8a, 8b, 9a, 9b, 10a, 10b of a pair 8, 9 and 10 with respect to the other carriage 8a, 8b, 9a, 9b, 10a, 10b of the same pair 8, 9 and 10 that is contiguous thereto.

Advantageously, the track 7 comprises at least one outgoing part 7a which has at least one substantially rectilinear portion, which extends substantially tangentially to the carousel 2, substantially extending between at least one station 12 for receiving the containers 4 to be transferred onto the carousel 2 and at least one station 13 for delivering the containers 4 picked up from the carousel 2.

Along the outgoing part 7a of the track 7 and substantially at the region of tangency between the carousel 2 and said outgoing part of the track 7 there is a station for loading and unloading the containers 4, which is arranged, conveniently, in an intermediate position between the receiving station 12 and the delivery station 13, at which the carriages 8a, 8b, 9a, 9b, 10a, 10b load or unload the containers 4 from the pans 3 of the carousel 2.

Conveniently, the track 7 comprises a return part 7b, preferably also provided with at least one substantially rectilinear portion and connected to the outgoing part 7a by means of connecting parts 7c and 7d having a substantially curvilinear shape.

It should be noted that at the receiving station 12 and at the delivery station 13 there is at least one respective resting surface 14a, 14b for the containers 4, which has a longitudinal extension that is substantially parallel to the outgoing part 7a of the track 7 and in particular to its substantially rectilinear portion.

Advantageously, upstream of the receiving station 12 it is possible to provide a first linear conveyor, not shown, that has the task of feeding the receiving station 12 and, more particularly, the corresponding resting surface 14a with containers 4 to be transferred to the carousel 2, while downstream of the delivery station 13 there may be at least one second linear conveyor, also not shown, which is designed to receive the containers 4 picked up from the carousel 2 by the carriages 8a, 8b, 9a, 9b, 10a, 10b and arriving at the delivery station 13, at the corresponding resting surface 14b.

The operation of the machine, according to the invention, is as follows.

Figure 1:
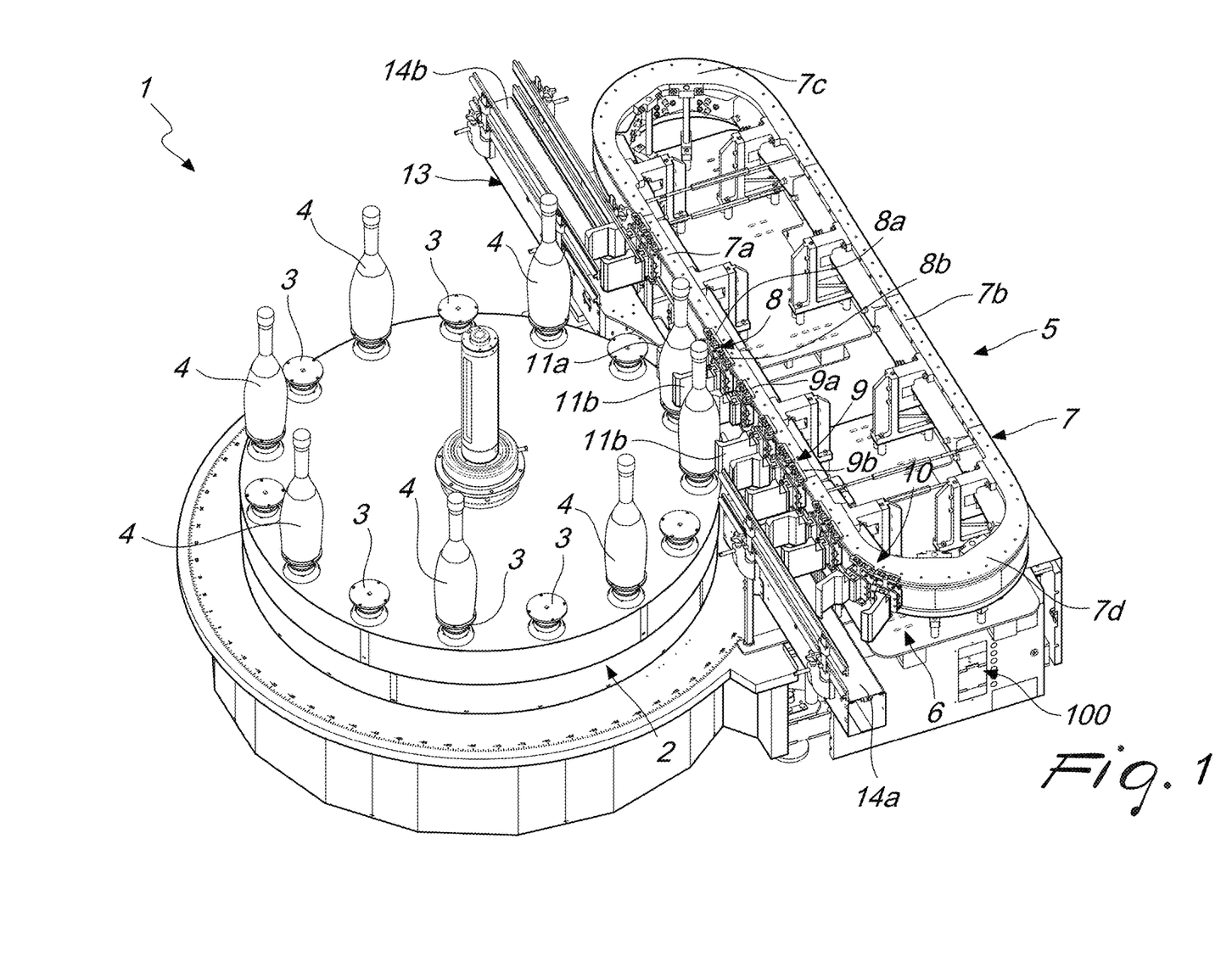
FIG. 1 is a perspective view from above of a machine according to the invention.
Figure 2:
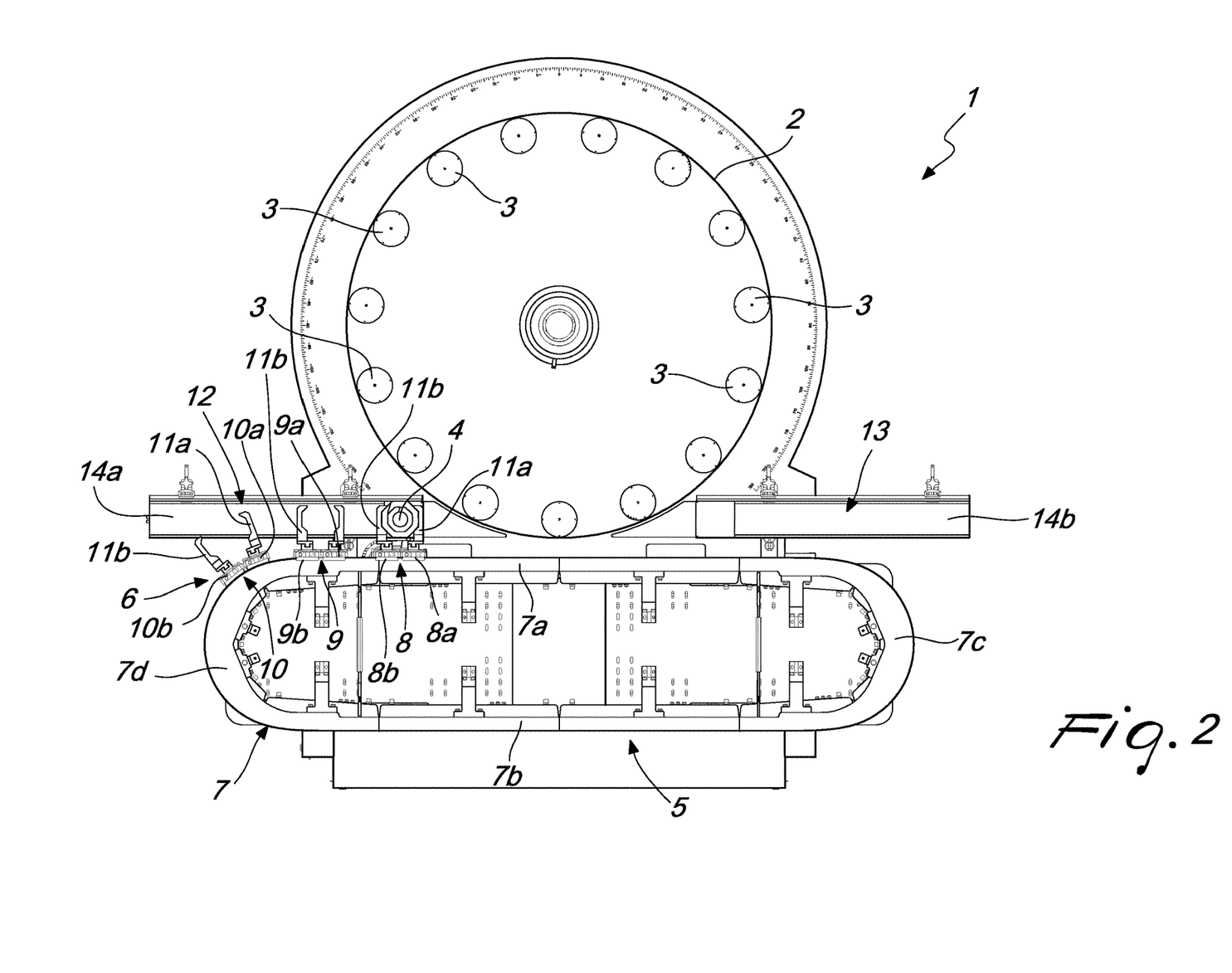
FIGS. 2 to 7 are sequential top plan views of the steps of loading onto the carousel a container to be processed.

With reference to the situation shown in FIG. 2, a container 4 arranged on the resting surface 14a of the receiving station 12 is clamped between the jaws 11a, 11b of the carriages 8a, 8b of a first pair 8 of carriages that is transiting at the receiving station 12 along the outgoing part 7a of the track 7.

Figure 3:
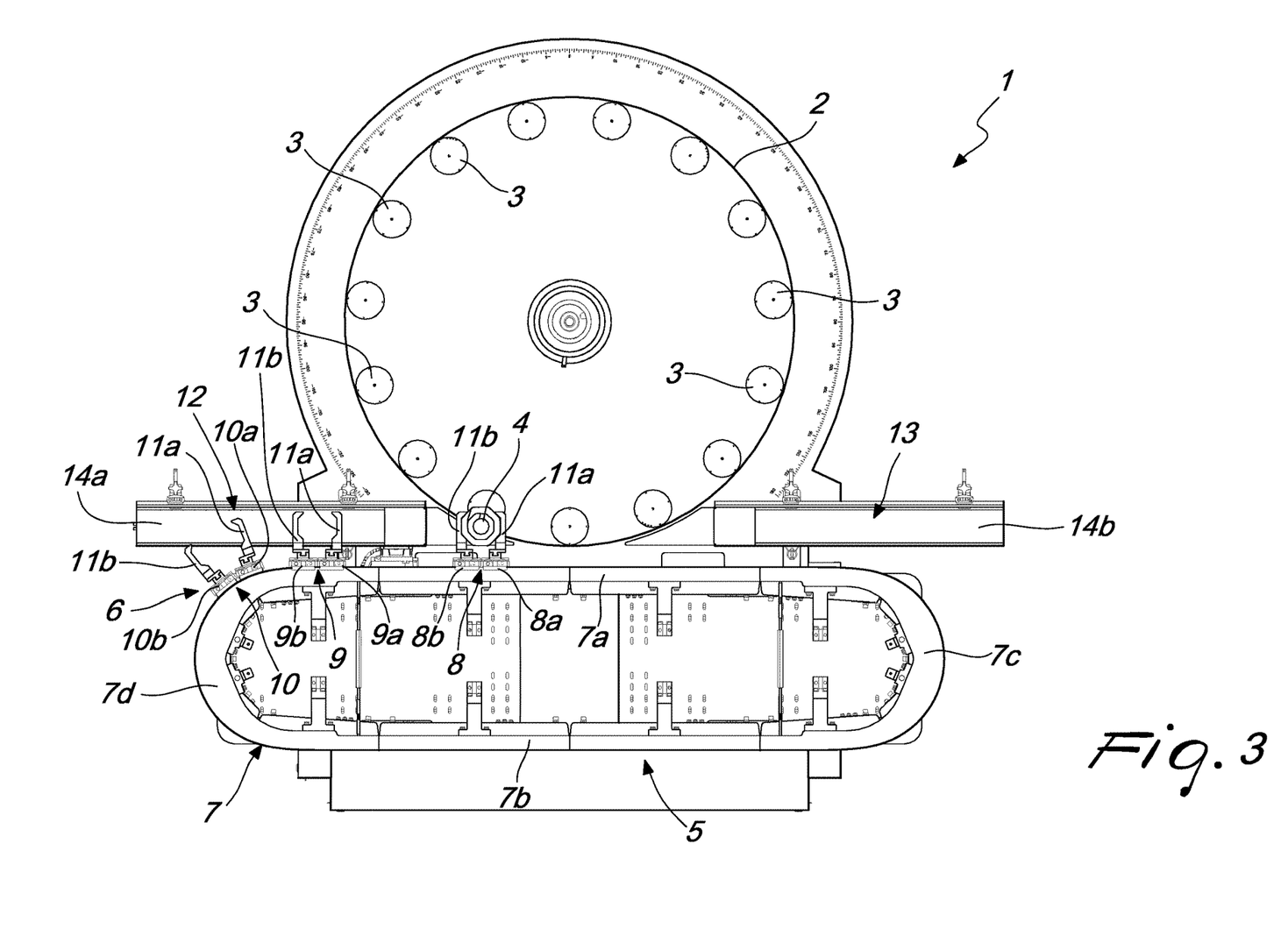

At this point, under the control of the control means 100, the carriages 8a, 8b of the first pair 8, with the container 4 clamped between the respective jaws 11a, 11b, moving at the same speed, undergo a progressive acceleration in their movement along the outgoing part 7a of the track 7, with respect to the pairs 9 and 10 of carriages that directly follow, according to their direction of movement along the track 7, so as to bring the container 4 clamped between the jaws 11a, 11b of the carriages 8a, 8b of the first pair 8 closer to the region of tangency between the carousel 2 and the outgoing part 7a of the track 7, reaching a speed that is substantially synchronized with the speed with which the pans 3 move on the carousel 2, as shown in FIG. 3.

Figure 4:
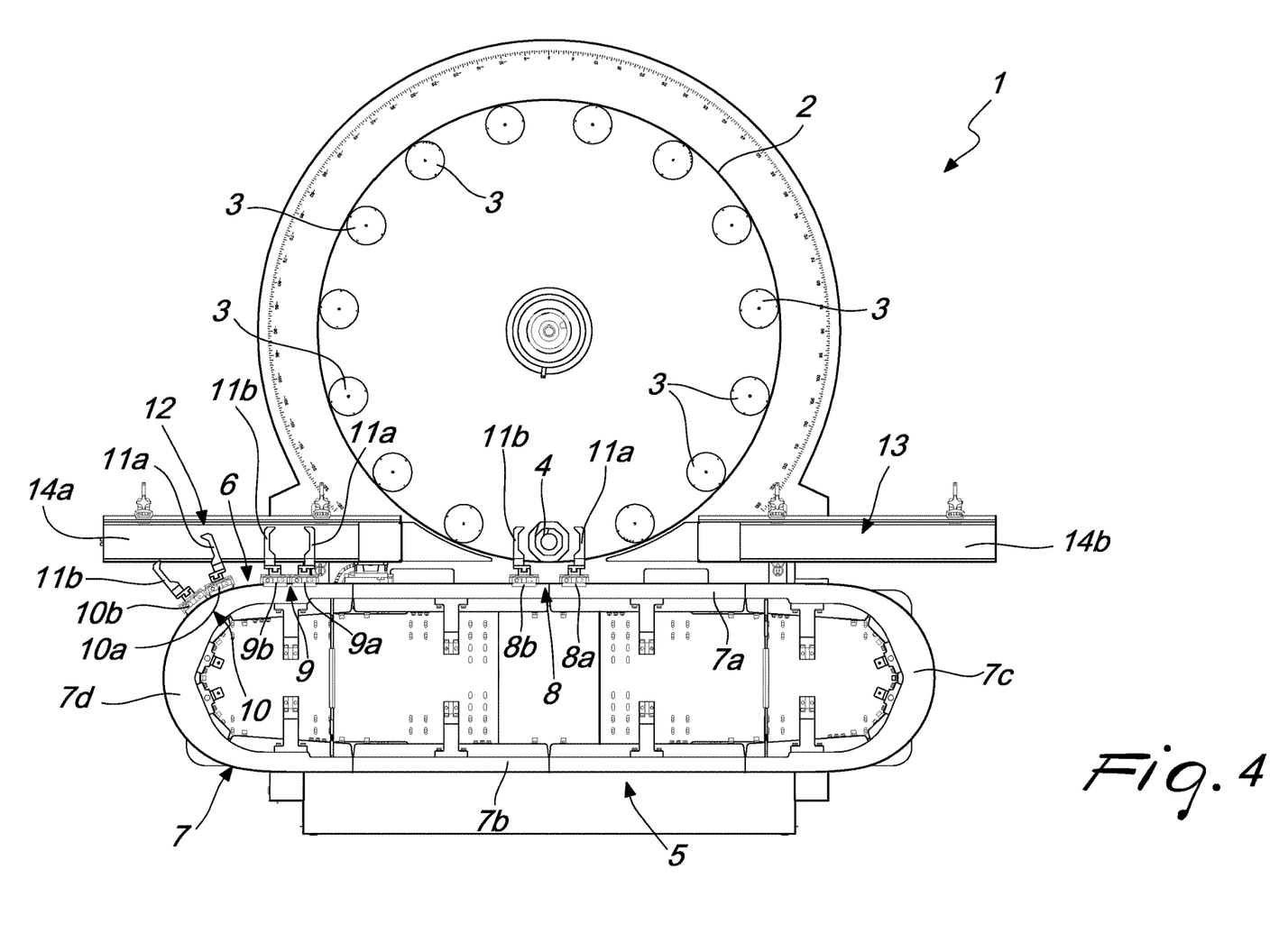

As the carriages 8a, 8b approach the region of tangency of the outgoing part 7a of the track 7 with the carousel 2, the control means 100 vary the speed of the carriages 8a, 8b with respect to each other, so that upon reaching the region of tangency of the outgoing part 7a of the track 7 with the carousel 2 the jaws 11a, 11b of the carriages 8a, 8b are disengaged from the container 4, while the latter is received in a resting arrangement by a pan 3 of the carousel 2 that is simultaneously passing through the region of tangency of the outgoing part 7a of the track 7 with said carousel, as shown in FIG. 4.

Figure 5:
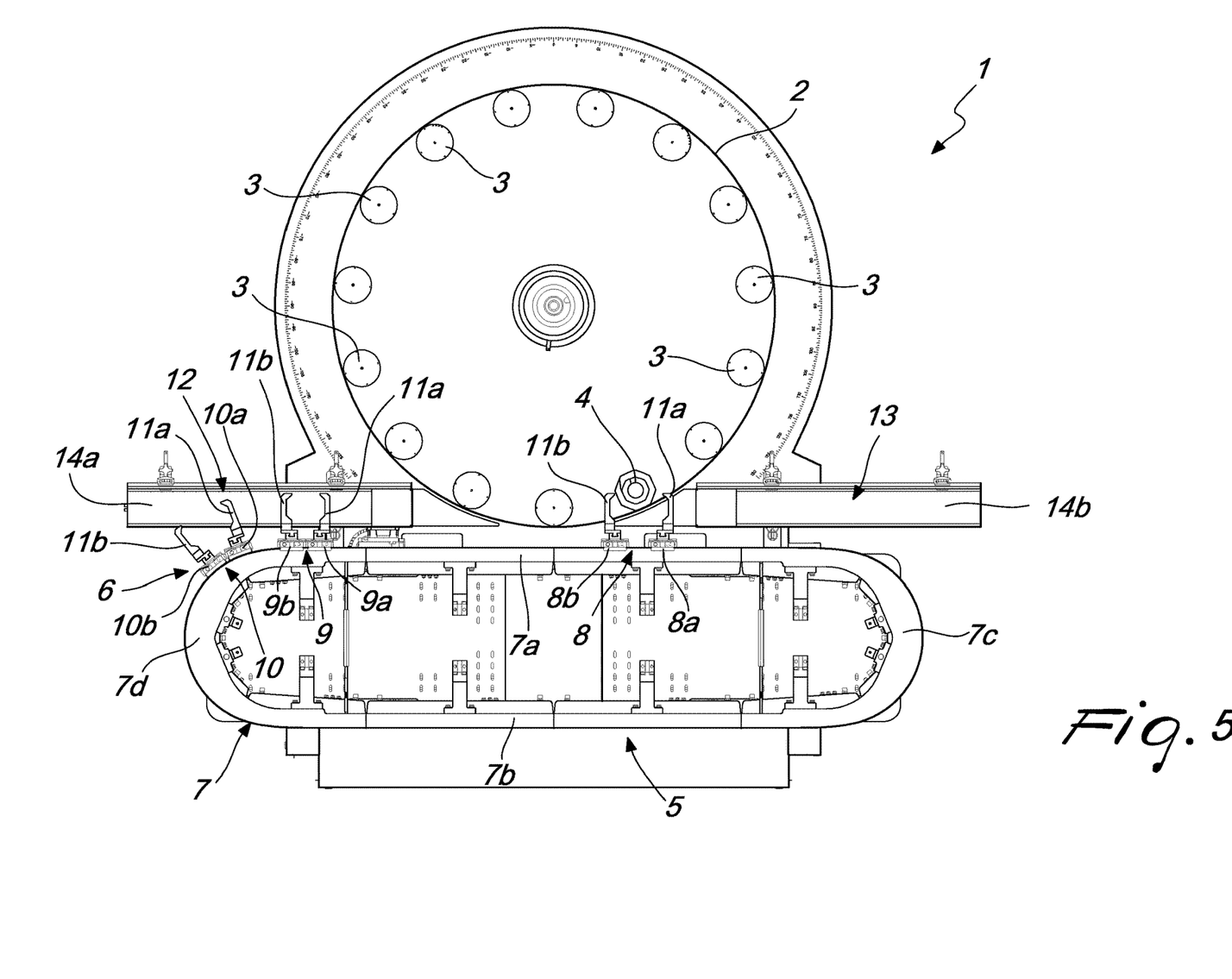
Figure 6:
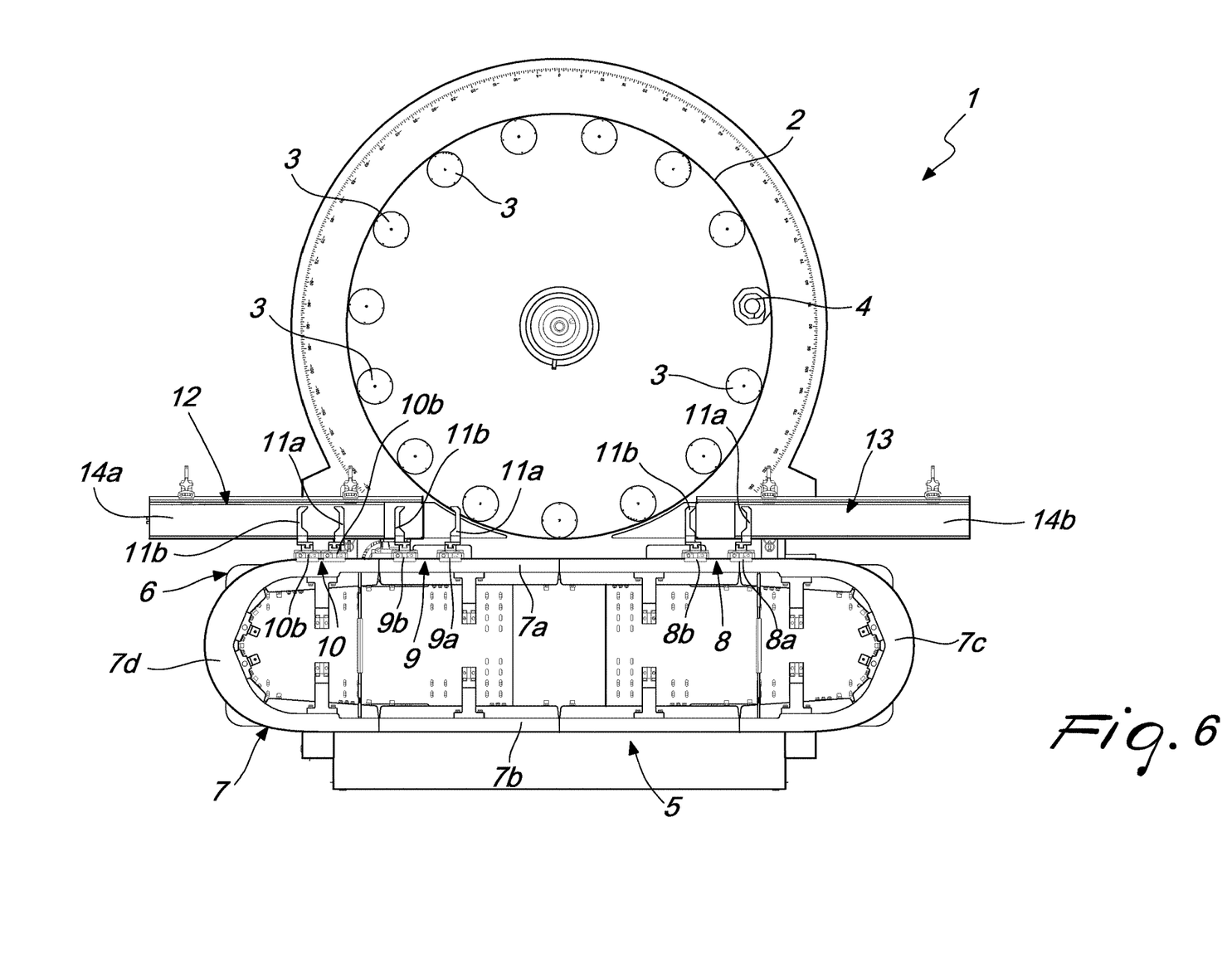
Figure 7:
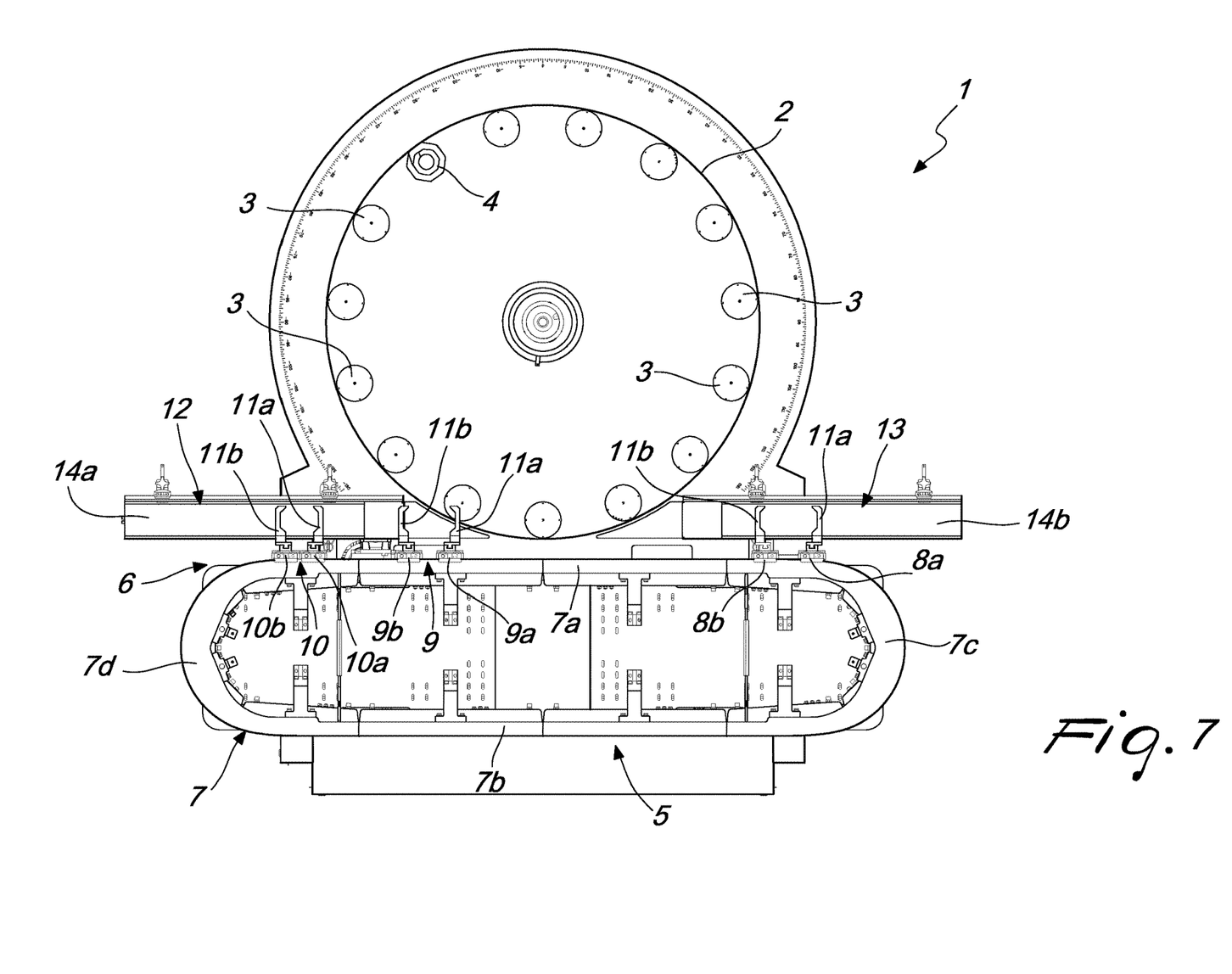

At this point, as shown by FIGS. 5, 6 and 7, while the carriages 8a, 8b continue in their movement along the outgoing part 7a of the track 7, the container 4 now picked up by the pan 3 on which it has been rested, proceeds with its movement on the carousel 2, so as to be able to undergo the processing to which it is subjected by the processing assemblies placed around said carousel.

At the same time, the carriages 9a, 9b of a second pair 9 of carriages immediately following the first pair 8, along the direction of motion of the carriages along the track 7, proceeds by approaching progressively the region of tangency of the outgoing part 7a of the track 7 with the carousel 2, reaching a speed that is substantially synchronized with that of the pans 3 of the carousel 2.

Figure 8:
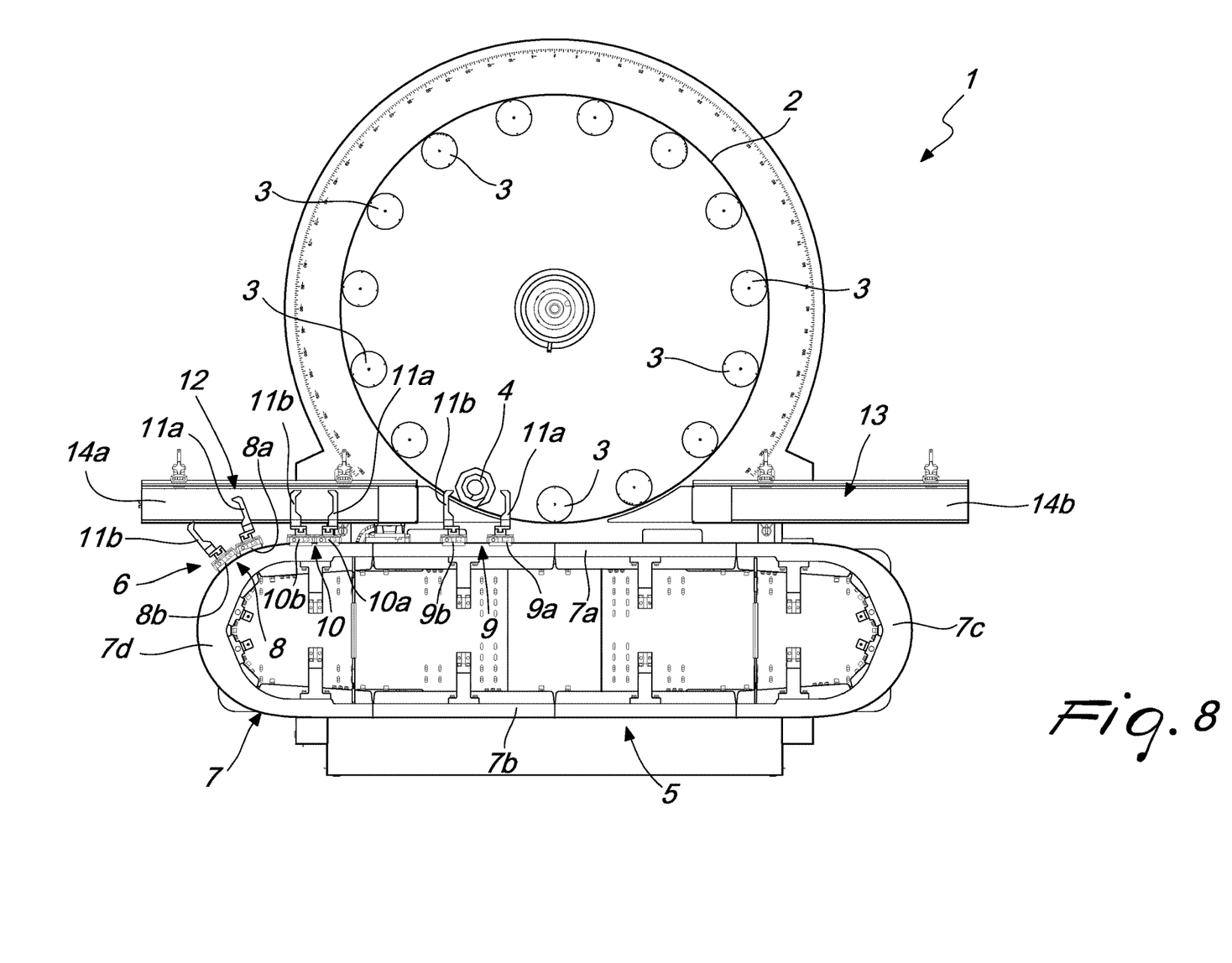
FIGS. 8 to 11 are again top plan views of a sequence of steps for unloading a container from the carousel.
Figure 9:
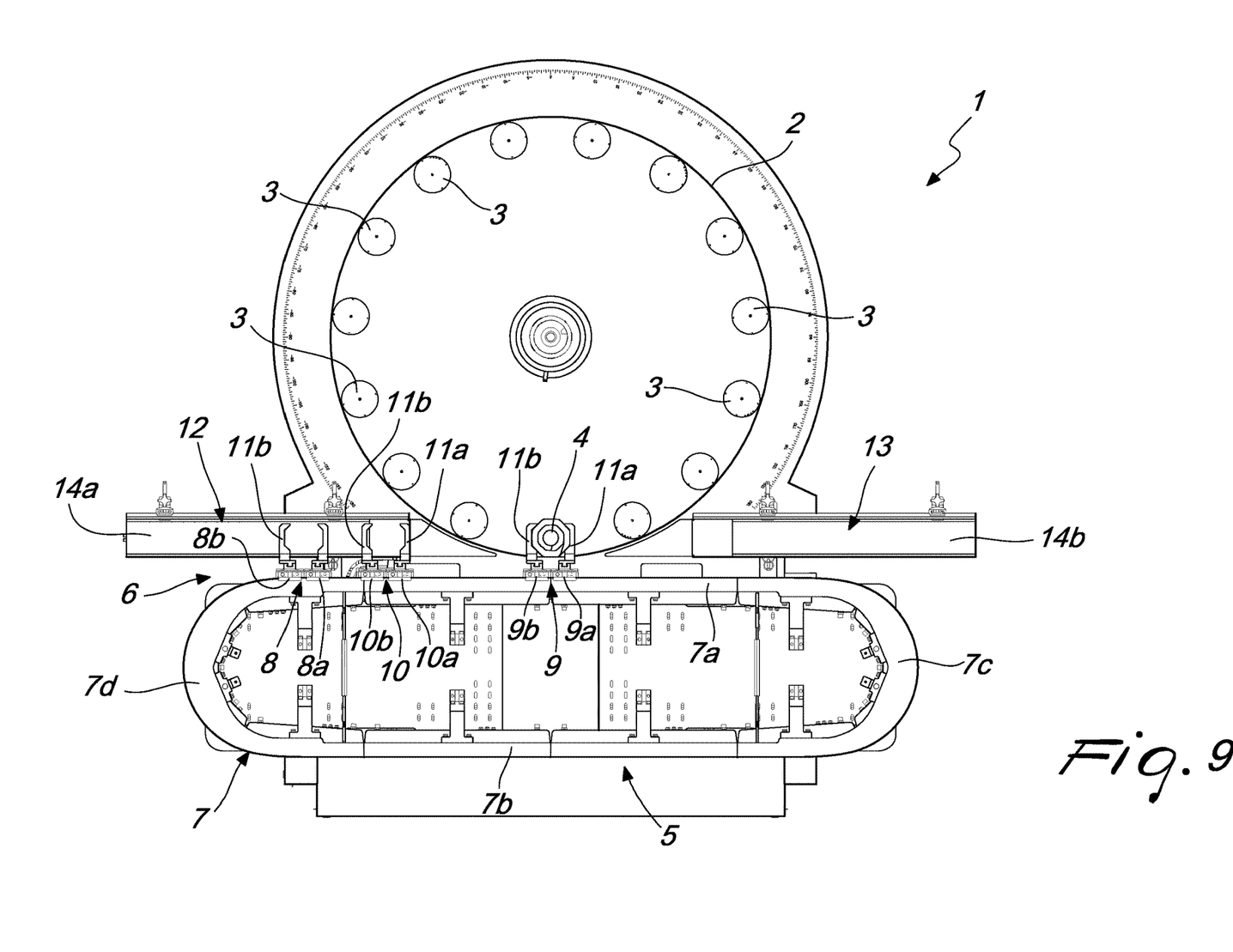

As shown in FIG. 8, while the carriages 8a, 8b of the first pair 8 have returned to a position proximate to the receiving station 12, after traveling along the return part 7b of the track 7 at a higher speed than that of the other pairs 9 and 10 of carriages, the carriages 9a, 9b of the second pair 9 proceed along the outgoing part 7a with a motion that is coordinated with the motion of a container 4 resting on a pan 3 of the carousel 2 progressively approaching the region of tangency of the outgoing part 7a of the track 7 with the carousel 2, so that when said container 4 has reached the region of tangency of the outgoing part 7a of the track 7 with the carousel 2 it is clamped between the jaws 11a, 11b of the carriages 9a, 9b of the second pair 9 of carriages, as shown in FIG. 9.

Figure 10:
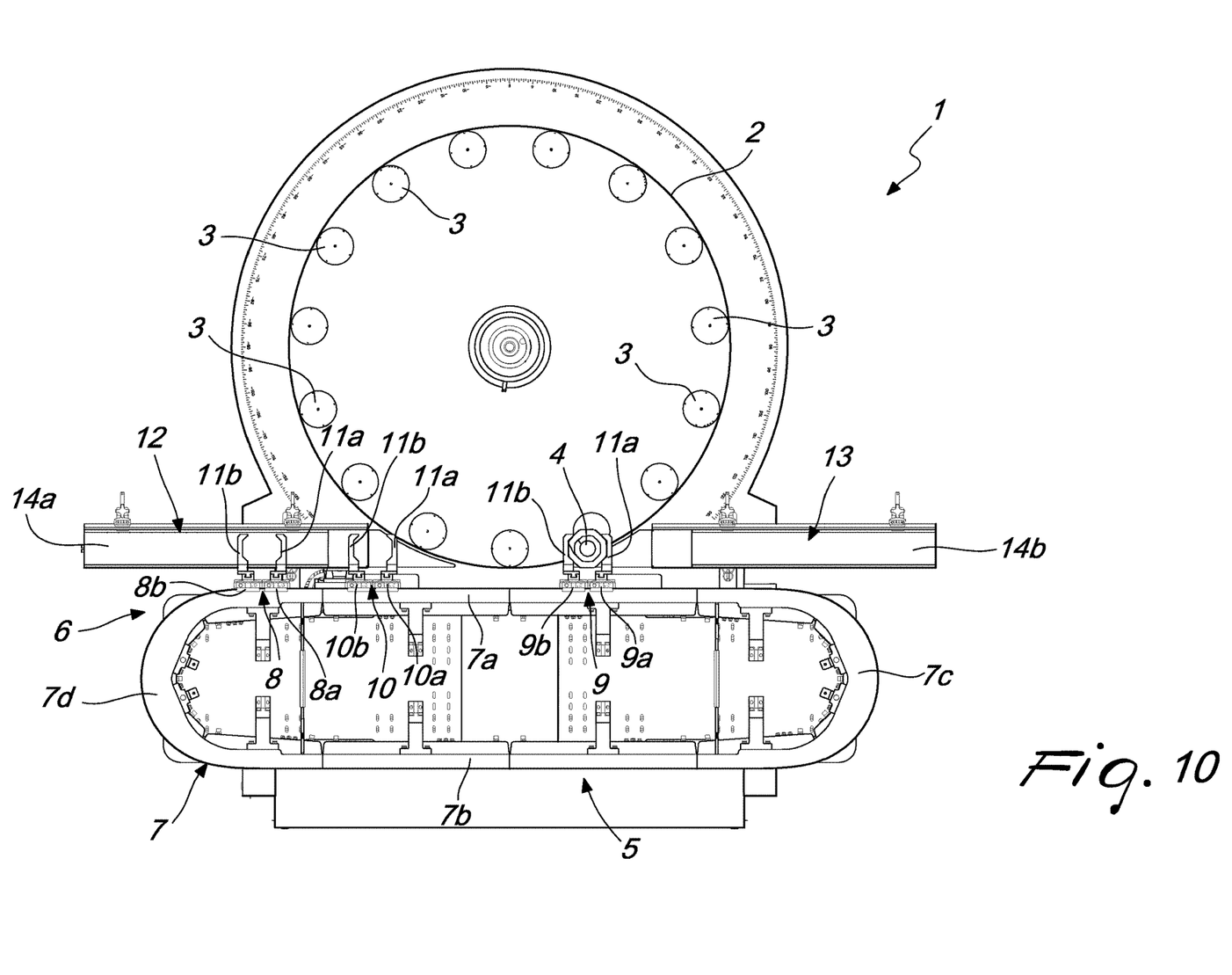
Figure 11:
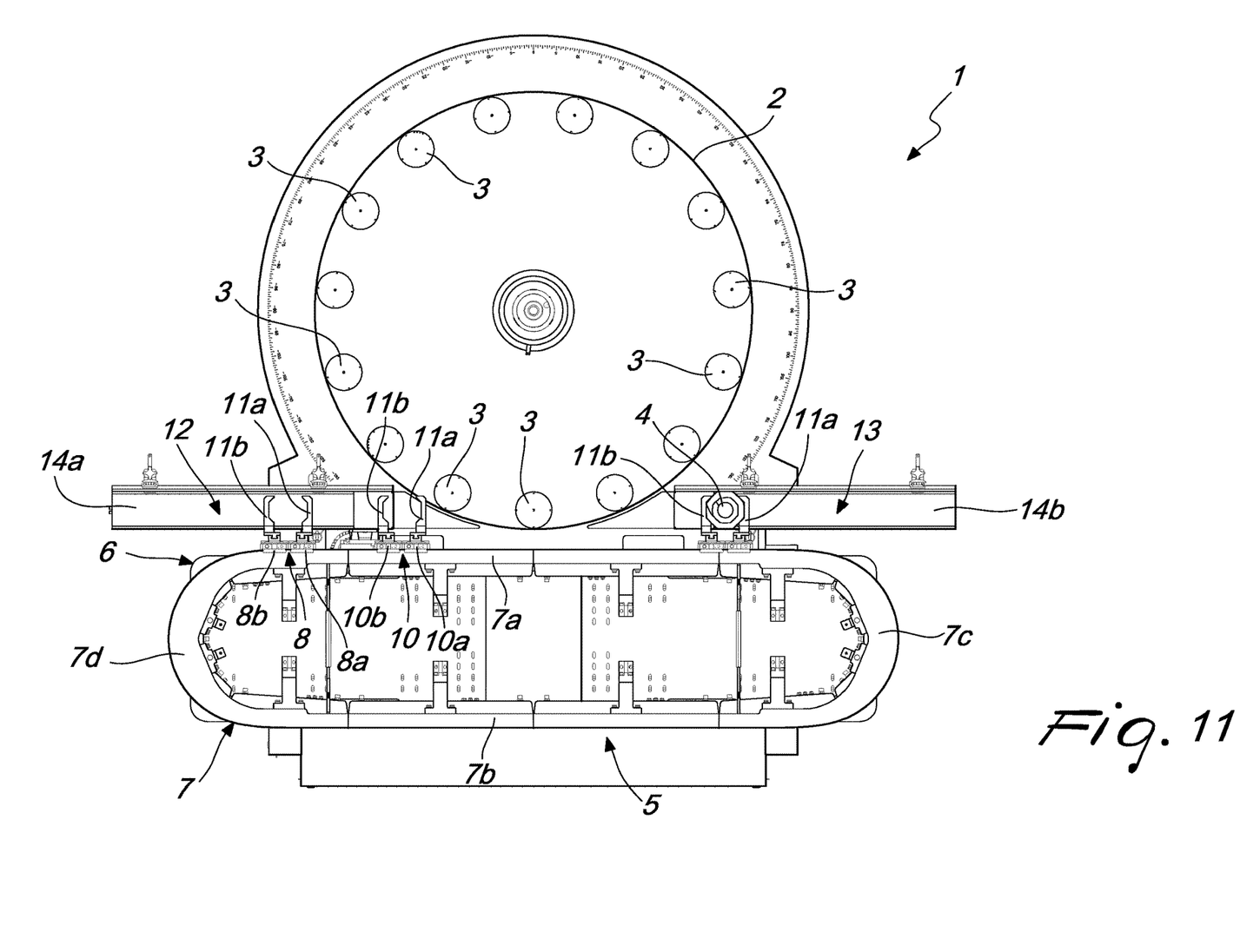

At this point, the container 4 clamped between the jaws 11a, 11b of the carriages 9a and 9b of the second pair 9 of carriages leaves the carousel 2 and is transported by the carriages 9a, 9b of the second pair 9 of carriages towards the delivery station 13, where it is delivered on the corresponding resting surface 14b, as shown by FIGS. 10 and 11.

In practice it has been found that the invention achieves the intended aim and objects, providing a carousel-type labeling machine that allows, by means of a simple reprogramming of the control means of the linear motor and the optional replacement of the jaws, to provide the format change of the containers in extremely faster times than the background art.

The invention thus conceived is susceptible of numerous modifications and variations, all of which are within the scope of the appended claims; all the details may furthermore be replaced with other technically equivalent elements.

In practice, the materials used, as well as the contingent shapes and dimensions, may be any according to the requirements and the state of the art.

The disclosures in Italian Patent Application No. 102021000009941 from which this application claims priority are incorporated herein by reference.

The invention claimed is:

1. A carousel machine for processing containers, comprising a rotating carousel, provided peripherally with pans for supporting individual containers to be processed, and means for loading/unloading the containers from said carousel, wherein said means for loading/unloading comprise at least one linear motor which has a stationary track with a closed path and handling carriages, which are mounted so that they can move slidingly and in mutual succession along said track and each support at least one respective jaw adapted to cooperate with a jaw supported by a contiguous carriage in order to engage, on mutually opposite sides, a container to be transferred or picked up from said carousel, control means for the control of said linear motor being provided which are adapted to actuate a variation of a mutual distance of mutually contiguous carriages in order to allow release or clamping of said container by corresponding said jaws;

wherein said track comprises at least one outgoing part which has at least one substantially rectilinear portion, which extends substantially tangentially to said carousel and extends substantially between at least one receiving station for receiving the containers to be transferred onto said carousel and at least one delivery station for delivering the containers picked up from said carousel.

2. The machine according to claim 1, further comprising at least one pair of mutually contiguous said handling carriages, which are mounted so that they can move slidingly along said track and support the respective jaws adapted to mutually cooperate in order to engage, on mutually opposite sides, a container to be transferred or picked up from said carousel, said control means for the control of said linear motor being provided which are adapted to actuate the variation of the mutual distance of said pair of carriages in order to allow the release or clamping of said container by said jaws.

3. The machine according to claim 2, further comprising a plurality of pairs of handling carriages arranged in mutual succession along said track, the handling carriages of each pair of carriages supporting the respective jaws adapted to mutually cooperate to engage a respective container for each pair of carriages.

4. The machine according to claim 2, wherein said carriages are actuated in motion along said track in order to move along said track in a handling direction, said control means being adapted to provide said variation of the distance between said contiguous handling carriages by means of a variation of the speed of one of said handling carriages with respect to a contiguous handling carriage.

5. The machine according to claim 1, wherein said comrpises a return part connected to said outgoing part by means of substantially curvilinear connecting parts.

6. The machine according to claim 1, further comprising, at said receiving station and at said delivery station, at least one respective resting surface for said containers which extends longitudinally substantially parallel to said outgoing part and which resting surfaces are offset from said outgoing part, in a direction transverse to a lengthwise direction of said outgoing part.

7. The machine according to claim 1, further comprising a first linear conveyor which feeds said receiving station with the containers to be transferred to said carousel, and at least one second linear conveyor designed to receive the containers picked up from said carousel and arriving at said delivery station and which first and second linear conveyors are offset from said outgoing part, in a direction transverse to a lengthwise direction of said outgoing part.

8. The machine according to claim 1, wherein said jaws are supported detachably by the respective handling carriages and are interchangeable with others having a different shape as a function of the type of the containers.

9. The machine according to claim 1, further comprising, at said receiving station, at least one first resting surface for said containers which extends longitudinally substantially parallel to said outgoing part, and, at said receiving station, at least one second resting surface for said containers which extends longitudinally substantially parallel to said outgoing part, wherein a portion of said carousel is located in a space that separates the at least one first resting surface from said at least one second resting surfaces.

10. The machine according to claim 1, further comprising a first linear conveyor which feeds said receiving station with the containers to be transferred to said carousel, and at least one second linear conveyor designed to receive the containers picked up from said carousel and arriving at said delivery station, wherein a portion of said carousel is located in a space that separates the at least one first linear conveyor from said at least one second linear conveyor.

* * * * *

UNITED STATES PATENT AND TRADEMARK OFFICE
CERTIFICATE OF CORRECTION

| | | |
|---|---|---|
| PATENT NO. | : 12,410,018 B2 | Page 1 of 1 |
| APPLICATION NO. | : 18/287073 | |
| DATED | : September 9, 2025 | |
| INVENTOR(S) | : Luca Bonardi | |

It is certified that error appears in the above-identified patent and that said Letters Patent is hereby corrected as shown below:

In the Claims

Column 6, Claim 5, Lines 6-7 read:
"wherein said comrpises a return part"

They should read:
--wherein said track comprises a return part--

Signed and Sealed this
Ninth Day of December, 2025

John A. Squires
*Director of the United States Patent and Trademark Office*